July 28, 1964   K. WENDT   3,142,771
CONTROL AND INDICATING APPARATUS FOR AUTOMATIC WASHING MACHINES
Filed Dec. 16, 1960   7 Sheets-Sheet 1

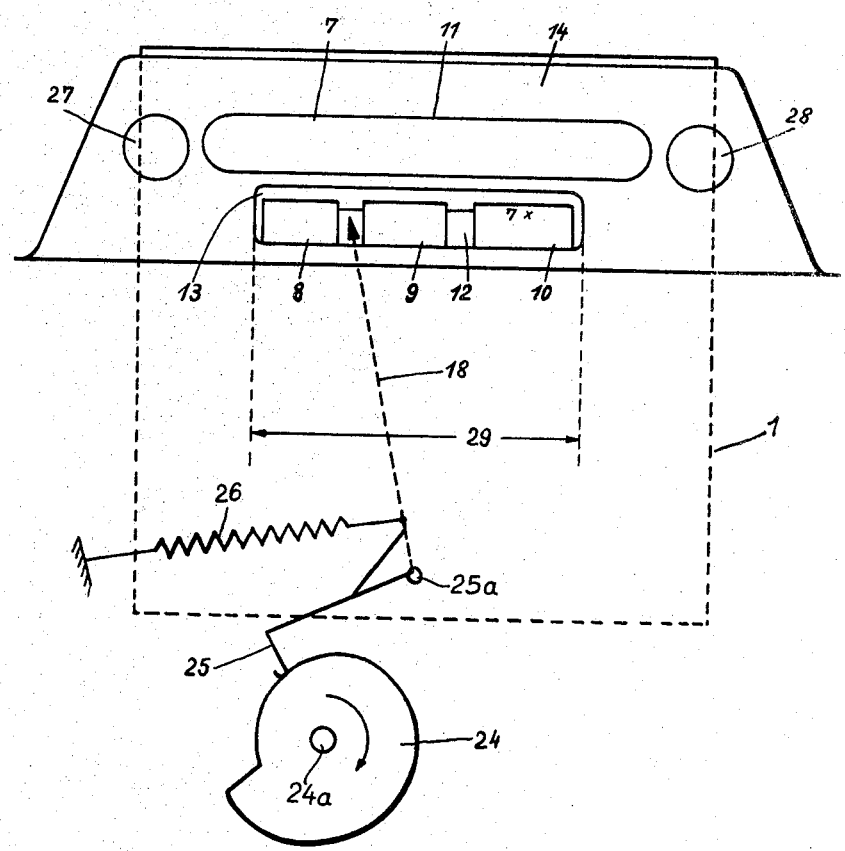

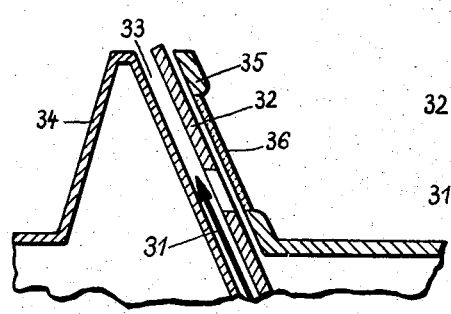
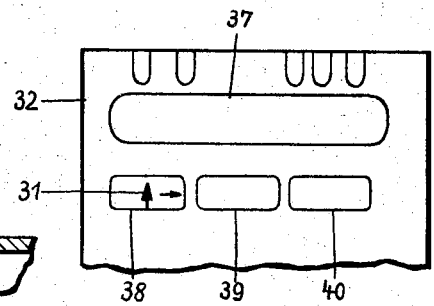
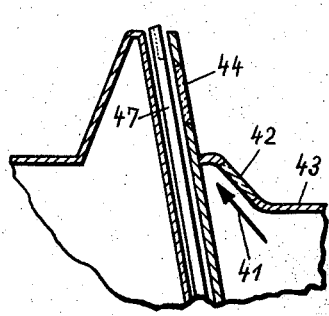
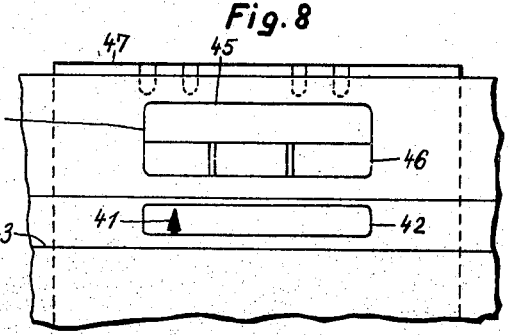
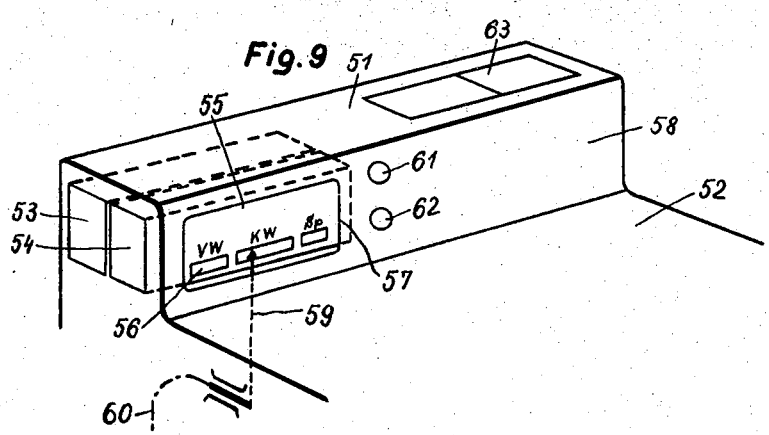

July 28, 1964 K. WENDT 3,142,771
CONTROL AND INDICATING APPARATUS FOR AUTOMATIC WASHING MACHINES
Filed Dec. 16, 1960
7 Sheets-Sheet 5

July 28, 1964             K. WENDT             3,142,771
CONTROL AND INDICATING APPARATUS FOR AUTOMATIC WASHING MACHINES
Filed Dec. 16, 1960             7 Sheets-Sheet 6
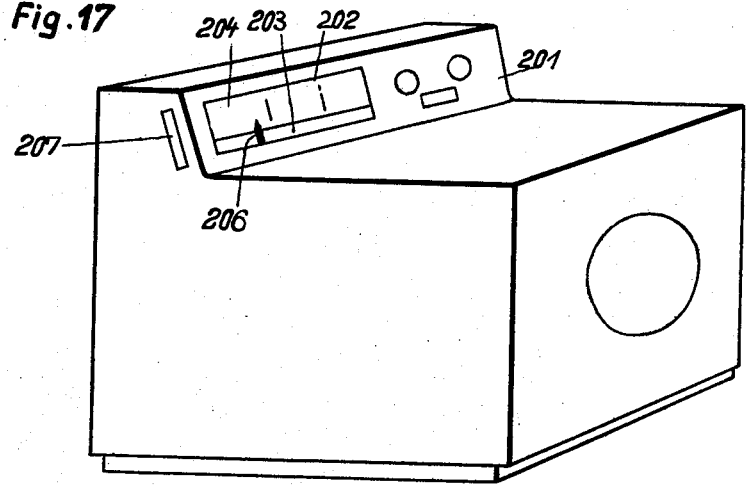
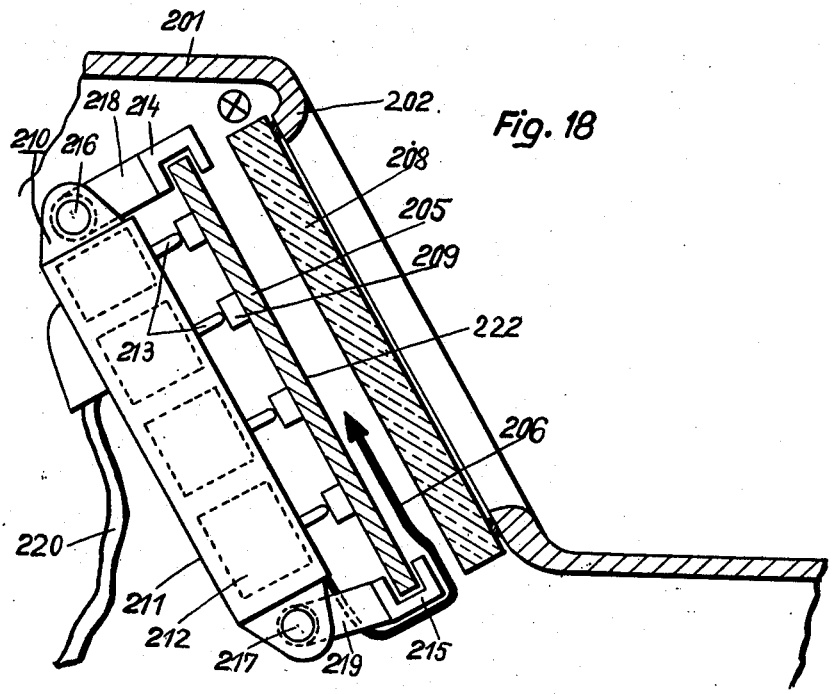

United States Patent Office

3,142,771
Patented July 28, 1964

3,142,771
CONTROL AND INDICATING APPARATUS FOR AUTOMATIC WASHING MACHINES
Karl Wendt, Berlin-Siemensstadt, Germany, assignor to Siemens - Electrogerate Aktiengesellschaft, Munich, Germany, a German corporation
Filed Dec. 16, 1960, Ser. No. 76,226
Claims priority, application Germany Dec. 17, 1959
7 Claims. (Cl. 307—115)

My invention relates to automatic washing machines and more particularly to a control and indicating apparatus which permits setting the operation-controlling program mechanism of such a machine in accordance with a selected laundering program as required, for example, for washing white laundry at near-boiling temperature, colored laundry at a lower washing temperature, or washing rayon, nylon and other articles at still lower temperature, and so forth.

The program-control devices of such washing machines as a rule, have a movable assembly which passes through a number of sequential switching steps in order to control the agitator or washing drum of the machine, its pump, valves and other devices to perform the particular operations required at each switching step of the programmer. The programmer is driven by an electric motor, an electromagnetic stepping mechanism or a similar electric drive. In order to set the programmer to different programs, depending upon the particular type of laundry and the soiling degree thereof, such machines have been provided with selector devices that permit manually setting the programmer to the particular program desired. Such selector devices may operate with punched cards, for example. These cards, when in operation, are connected with the driving motor of the programmer so that they move in a given direction together with the advancing motion of the programmer. The user of the machine in this case has a multiplicity of punched cards available which are correlated to respectively different programs. By inserting a selected card into the device, this card enters into operative connection with the programmer. The cards are provided with suitable legends and indicating scales so that the instantaneous stage of operation can be read off the indicating scale of the traveling card.

There are also program-selector devices for washing machines which are provided with a multiplicity of electric switches. These switches are provided with respectively different groups of contacts. Depending upon which of the switches is actuated, this switch provides the switching combination required for the corresponding program. These program-selector switches remain stationary during the advancing motion of the programmer proper and are connected with the programmer only by the electric connecting leads. Such selector switches can be built in such a manner that the individual program-switching members are removable from the automatic machine and are connected with the programmer only when they are inserted into the selector device. However, there are also selector devices in which a single selector switch, adapted to provide a choice between several programs, is permanently connected with the washing machine.

It is an object of my invention to provide a control and indicating device for selectively programming the operation of a washing machine, which device facilitates selecting the particular control program desired and provides particularly simple and reliable means for supervising and observing the instantaneous operating stage of the washing machine.

According to one of the features of my invention, I provide a program-control device with program-selector means that are operatively connected to the control device and are provided with manually removable means for selection of different washing programs. I further connect indicator means with the program-control device, these means being movable in accordance with the course of the selected washing programs. I furthermore provide a number of different indicating scales which are connected with the manual selector means and are correlated to the different washing programs, so that the selected actuation of the manual selector means automatically places one of the available scales into coactive relation to the indicator means. As a result, the program-selector device simultaneously constitutes an active component of the supervisory or indicating device with the result that each program selection is automatically accompanied by placing the proper indicating scale in active relation to the indicating means driven from the advancing programmer. This not only affords a simple and reliable indication and hence easy supervision of the machine operation but also provides for any selected program an indicating scale of convenient size from which the occurrence of each stage of operation, such as agitating, washing, rinsing, centrifuging, is clearly apparent. This is of considerable advantage in view of the fact that the various washing programs may be greatly different from each other with respect to the sequence and number of individual operations. For example, some washing programs require a pre-washing operation, a supply of fresh water, another washing operation, and a multiplicity of alternate rinsing and pumping operations. There are also washing programs to be set into the same machine in which one or more rinsing operations take place, after which a washing operation occurs, to be followed by one or more rinsing operations. Another washing program may require employing a single or several rinsing operations with cold water. All of these various types of operation are readily, reliably and most conveniently indicated by virtue of a control and indicating apparatus according to the invention.

The respective indicating scales for the selected programs therefore may differ from each other in accordance with the sequence of the individual operations as well as the duration thereof.

While, as stated, the indicating scales of the apparatus according to the invention are joined with the manually insertable or adjustable components of the program selector, the apparatus further comprises an indicating means which constitutes a component that normally is not removable from the washing machine and which cooperates with the programmer proper in order to show on the selected scale the particular stage or range of operation being performed by the machine. This indicating means may consist of a pointer structure which is mounted in the washing machine, driven by the programmer of the machine, and indicatingly related to the particular scale of indicia appertaining to the program being performed.

Since such a pointer structure accurately represents the operating condition of the programmer, a very reliable indication of the instantaneous operating condition is obtained.

The apparatus according to the invention may have such a design that the point always passes through the same travel distance from the beginning to the end of a program. According to another feature, if desired, the programmer and the pointer can be controlled so that, aside from advancing travel or advancing steps essential for changing the operation of the machine, they also pass through advancing steps in which no essential change in operation takes place. In such a case the latter advancing steps are preferably traveled by the pointer and the programmer at increased speed. Such portions of the total travel, in which increased speed of the pointer is preferable, may be located before, intermediate or behind the individual active operating conditions of the washing machine.

The indicating portion of the apparatus can be so designed that the pointer is virtually visible on its entire travel path. However, if desired, the indicating scales may be so designed that the pointer is visible only in the ranges that are essential for the selected program and that are particularly marked on the indicating scale.

According to a preferred embodiment of the invention, the manually adjustable components of the apparatus, when in normal use, are completely removable from the washing machine, and are insertable, for the purpose of program selection, into a multiple-switch unit of the program-selector device. The multiple switch unit is permanently joined with the washing machine and comprises the electric switches to cooperate with the removable selector member. In an apparatus of this type it is preferable to provide the removable selector member with a program designation (for example indicating the kind of laundry and the degree of soiling) as well as with the appertaining program-indicating scale, this scale being located on an area of the removable selector member which is visible when the selector member is inserted and in active position.

The manually operable program-selector member, completely removable from the washing machine, may be given different designs and different shapes. For example, this member may be given the shape of a rod having circular or rectangular cross section. Also applicable are plate-shaped selector members that, for use in the washing machine, are inserted into the slot of a holder that forms part of the selector device and is preferably provided with transparent portions, window openings or the like in order to expose to vision the program designation and the indicating scale marked on the selector member. For this purpose the washing machine is preferably provided with a disc-shaped holder structure which protrudes upwardly from the machine cover and possesses a downwardly inclined front side in which the slot for the selector plates, rods or the like, as well as the openings for exposing the indicating scale are located.

According to other embodiments of the invention, the manually adjustable selector member is normally not removable from the washing machine. In this case a scale holder is preferably joined with the manual adjusting member, and a number of different indicating scales, corresponding to the number of selectively available programs, is provided on the scale holder. The scales may be permanently joined with the scale holder. However, in order to permit subsequent changing of programs, the scale may be located on a structural unit that can be removed from the manually adjustable holder portion of the program-selector device. In order to facilitate a change in program, the removable unit is preferably so designed that it can be exchanged without requiring the use of special tools. For example, the exchange may be effected simply by plugging the unit into the selector device or pulling it out of the device.

According to another feature of my invention, the manually displaceable portion of the selector device is designed as a rectangular flat member, such as a plate or card, which is provided with selectively arranged recesses, bosses or the like means for actuating a number of selector electric switches. This flat member remains fixed during the course of the control program, whereas the multiplicity of switch contacts to cooperate with the flat member are fastened on a slider which during progress of the control program is passed along the recesses, bosses or other control means of the flat member. The progressive travel of the slider is preferably incremental. The designation of the particular program and the appertaining scale of indicia is preferably located on the side of the flat member facing the observer, whereas the recesses, bosses or other switch control means of the flat member are located on the rear side thereof.

In such an apparatus, since the manually selected member remains stationary during operation, the indicating scale for exhibiting the instantaneous operating condition of the washing machine is likewise stationary. This affords a more clearly readable indication of the operating condition and also affords graphical representation on the manual selector member any desired number of different control programs on an indicating scale area having the same size for all selectively applicable selector members. It is thus possible to provide the selector members with indicating scales of particularly large size with the result that the condition of the machine can readily be read off from relatively great distance and that the requirements relative to the precision of the switch-control means are reduced by virtue of the relatively great dimensions of the flat selector member.

The switch-carrying slider for cooperation with the selector plate is preferably advanced by means of a flexible shaft driven from a system of stepping switches, or from a synchronous motor through an interposed stepping mechanism. By virtue of the fact that with such an incremental drive the slider advances in well defined steps relative to the stationary selector member, the various operations to be released by coaction of the slider switches with the selector member are performed with great precision.

Two objectives, namely service as an indicating device and service as a program-switching device, are satisfied in a particularly favorable manner by such a selector member in form of a flat shape, having the program designation and the appertaining indicating scale located on one side and the switching recesses, bosses or other means on the other side. The plate member, exhibiting essentially the indicating scale on the side facing the observer, forms a cover which hides and protects the multiple-switching device and the appertaining driving members.

It is preferable to connect a pointer with the above-mentioned switching slider so that the pointer participates in the travel of the slider and cooperates with the indicating scale. The pointer may be located on the front side of the program selector member so as to travel along the indicating scale. If desired, however, an optical pointer may be used which is constituted by a lamp connected with the slider and projecting a beam of light through a transparent slit in the selector plate so that the indication of the scale is effected by a light spot. According to another embodiment, a pointer consisting of plastic sheet metal or the like is made to travel behind the program plate or card member, the plate having a slit through which the pointer is visible, and the pointer being illuminated from behind by a lamp.

While in a control and indicating device according to the invention a particular program card or plate may be provided for each of the available programs respectively, so that only one card is inserted into the holder of the machine depending upon the one program to be performed at a time, the selector means may also be modified by combining a plurality of programs on a rectangular selector plate having switch-actuating recesses, bosses or other means as described above. The latter act upon the switches of the slider in dependence upon the position in which the program plate is inserted into the holder. In this case the program plate is also provided with a plurality of scales of which only the one is visible that corresponds to the one selected program.

The foregoing and other objects, advantages and features of my invention, said features being defined with particularity in the claims annexed hereto, will be apparent from, and will be described in, the following with reference to the embodiments of the apparatus according to the invention illustrated by way of example on the accompanying drawings, in which:

FIG. 1 is a front view and FIG. 2 a side view of a manually insertable program-selector plate; FIG. 3 is a section through the upper portion of an automatic washing machine showing the portion of the control and indicating device into which the selector plate according to FIGS. 1 and 2 is inserted; FIG. 4 is a front view of the same upper portion of the machine and illustrates schematically the connection of an indicating pointer with the programming device of the machine.

FIGS. 5 and 6 show respectively a lateral sectional view of a modified apparatus according to the invention and a front view of the same apparatus;

FIGS. 7 and 8 are respectively a sectional lateral view and a front view of still another modification;

FIG. 9 is a schematic and perspective view of another control and indicating apparatus according to the invention designed as the top portion of an automatic washing machine;

FIGS. 17 to 22 illustrate a washing machine with an apparatus according to the invention in which the manually operable selector component is designed as a rectangular plate along whose actuating bosses a multiple switch is passed along by means of a slider. More in detail FIG. 17 is a perspective view of the washing machine;

FIG. 18 is a cross section through the disc-type control portion of the machine;

FIG. 19 is a partial sectional view of the same device at the location where the selector plate is to be inserted;

FIG. 20 illustrates a schematic circuit diagram of the apparatus, and

FIGS. 21 and 22 show respectively different program plates.

Figure 1:
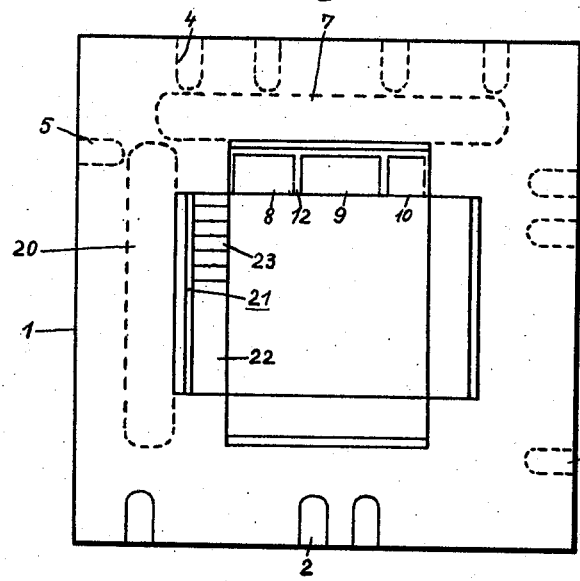
Figure 2:
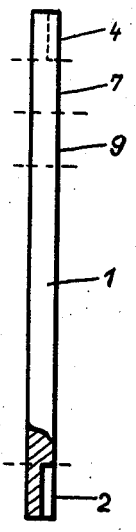

The apparatus according to FIGS. 1 to 4 is provided with one or more rectangular selector plates 1 of square shape as separately illustrated in FIGS. 1 and 2. The top 15 (FIG. 3) of the washing machine is provided with a desk-shaped portion 16 which protrudes upwardly from the top 15. The desk structure 16 has a sloping front wall at the side facing the person using the machine and is provided with a lateral slot 17 into which the plate 1 is inserted.

Figure 3:
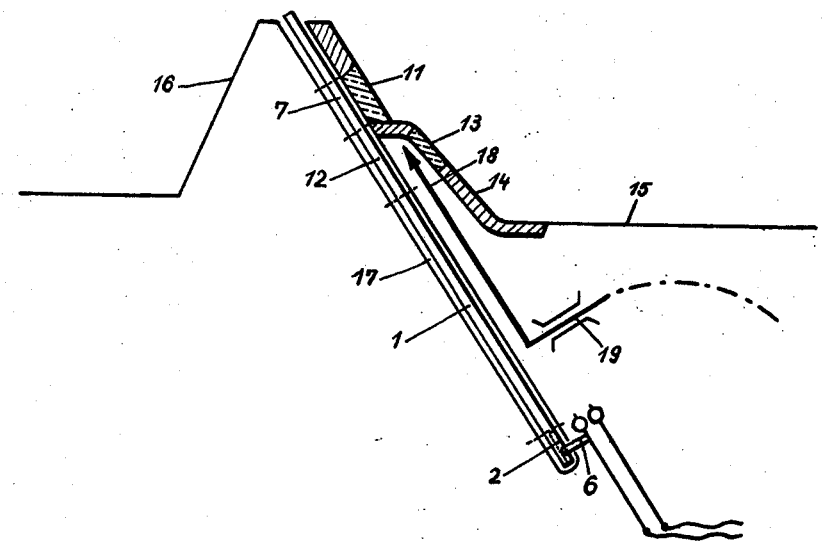

The plate 1 possesses along its edges a number of recesses 2, 3, 4, 5 which, when the plate 1 is inserted into the desk-shaped holder 16 of the apparatus cooperate with a multiple-switching device comprising a number of individual electric switches 6 of which only one is illustrated in FIG. 3. The switches 6 are electrically connected in circuits that are in operative connection with the program-control device. The connection of the switches 6 is in accordance with the particular control program and depends upon the number and position of the recesses 2, 3, 4, 5 located on one of the four marginal edges of the plate 1.

The marginal recesses 2 to 5 have the effect that those switches 6 that coact with the recesses remain open, whereas the other switches 6, not registering with such marginal recesses, are closed by the insertion of the plate 1. The designation or legend for identifying the control program of the plate 1 is located in the area denoted by 7. It is thus apparent from this area which particular kind of laundry is to be washed by the program determined by the recesses 2 located at the opposite edge of the plate. The indicating scale is located beneath the area 7. This indicating scale, correlated to the recesses 2, has successive indicating ranges 8, 9 and 10 corresponding to prewashing, main washing, and rinsing. When the plate 1 is inserted into the holder portion of the apparatus (FIG. 3) the area 7 for denoting the particular laundry to be washed is located in front of a window 11, and the appertaining indicating scale 12 is located behind a transparent window 13 in the sloping front wall 14 of the desk-shaped holder 16.

A pointer 18 for cooperating with the indicating scale 12 forms an irremovable part of the washing machine. The pointer is rotatably journalled at 19 and is driven in synchronism with the program-control device whose shaft is denoted by 24a in FIG. 4.

The plate 1 according to FIGS. 1 and 2 serves for the selection of several different programs, the selection being effected by placing the plate in one of four positions. For example, FIG. 1 also shows a washing program composed exclusively of a prolonged rinsing operation. The designating range for this rinsing operation is denoted by 20, the appertaining indicating scale by 21. The marginal recesses corresponding to this rinsing program are denoted by 3.

The scale design in this embodiment is so chosen that the pointer 18, before and after reaching the individual indicating ranges such as those denoted by 8, 9 and 10, passes through portions of its total travel in which it moves at increased speed. Such a portion 22 of increased speed is entered for example ahead of the scale range 23 which is correlated to the rinsing operation in FIG. 1. The advancing motion of the programming device in this case is so determined by the selector member 1 that it performs rapid switching steps when the pointer passes through the range 22 of the indicator scale.

As shown in FIG. 4, the motion of the pointer 18 is derived from the drive shaft 24a of the program-control device by means of a cam 24 coacting with a follower lever 25 pivoted at 25a. The pointer 18 is rigidly joined with the follower 25 and is connected with a return spring 26 which operates to snap the pointer 18 to the zero position after it has passed through the total distance 29 of its travel. Mounted laterally of the observation windows 11 and 13 of the desk-shaped housing are pilot lamps 27 and 28. The lamp 27 may indicate, for example by green light, that the program is in operation, whereas the lamp 28, for example with red light, indicates that the program is terminated but the machine not yet disconnected from the operating voltage.

While in the above-described embodiment of FIGS. 1 to 4 the pointer of the apparatus moves in front of the selector plate 1, the modified embodiment shown in FIGS. 5 and 6 has the indicating pointer 31 located behind the inserted selector plate 32. In FIGS. 5 and 6 the slot in the desk-shaped holder 34 is denoted by 33 (for insertion of the program-selector plate). The sloping front wall 35 of the holder 34 is provided with a window 36 behind which the area 37 of the selector plate is visible, in which area the kind of laundry to be washed is designated.

Also visible through the window 36 are openings 38, 39, 40 of the selector plate which are correlated to the individual operations (pre-washing, main washing, rinsing) of the program. The pointer 31 is movable behind these openings of the inserted selector plate. In this embodiment therefore the pointer is visible only in the operating ranges proper of the washing program, whereas the pointer movement in the intermediate ranges, prior to the washing operation proper and after termination of the last rinsing step, is covered by the selector plate and hence no longer visible.

In the embodiment shown in FIGS. 7 and 8 the motion of the indicating pointer is visible within a particular range located preferably beneath the indicating scale of the selector plate. The pointer 41 is visible through a window 42 in the top 33 of the washing-machine housing. A second window 44 is located directly above the window 42 and permits observing the area 45 where the type of laundry is indicated, as well as the indicating scale 36 of the selector plate 47.

While in the embodiments so far described the manual program-selector member has the shape of a flat plate, this member can also be given the shape of a rod, as is the case in the embodiment shown in FIG. 9. The automatic washing machine has a desk-shaped housing portion 51 adjoining the top 52 of the machine. Fixedly mounted in the desk portion 51 is a multiple-switching device 53 which comprises a multiplicity of individual electric switches (not shown in FIG. 9) which are placed into active electric connection with the program-control device in respectively different combinations depending upon the particular program selected. The selection of the program is effected by means of a rod-shaped switching member 54 which is manually insertable into the desk-shaped housing portion 51. The rod-shaped member 54 carries on its side facing the switching device 53 the actuating means, such as bosses or recesses, for the individual switches, corresponding to the program selected by the insertion of the particular member 54. At its front side, the member 54 carries a legend or marking 55 indicative of the type of laundry to be washed. Located beneath the legend is the indicating scale 56. The areas 55 and 56 are visible through a window 57 in the front wall of the desk-shaped housing portion 51. Also visible through the window 57 is the pointer 59 which is permanently connected with the automatic washing machine and is driven in a suitable manner from the program-control device, the connection of the pointer 59 with the program device being indicated by a dot-and-dash line 60.

The illustrated automatic machine may possess a different selector member 54 for each of the available washing programs. However, the apparatus may also be so designed that the selector member permits the selection of two different washing programs, depending upon the position in which the member 54 is inserted and thus operatively connected with the multiple-switching device 53. That is, the front and rear sides of the member 54 as shown in FIG. 9 correspond to one program, whereas the top and bottom sides of the member may be correlated to a different program so that it is only necessary to remove the member 54 and to turn it 90° before again inserting it, in order to switch from one washing program to another. For this purpose the member 54 must be given a square cross section. Denoted by 61 and 62 are pilot lamps which may be so connected that they indicate in different color that the program is in operation or that the program is terminated but the machine not yet disconnected from voltage. Denoted by 63 in FIG. 9 are openings in the housing 58 for charging soap or detergents into the machine.

Figure 10:
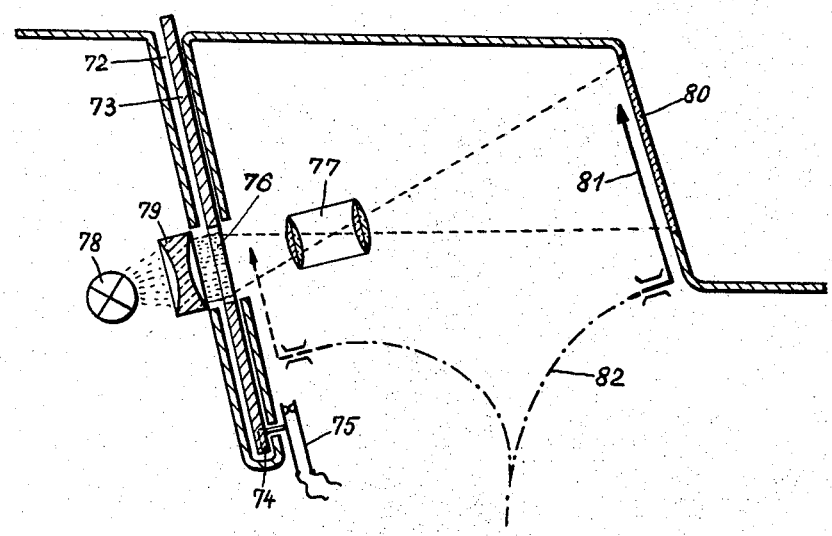
FIG. 10 shows schematically and in section another device according to the invention equipped with an optical projecting device for indicating purposes.

In the embodiment of FIG. 10 the selected program is indicated by means of an optical projector. The upper portion 71 of the automatic washing machine is provided with a slot 72 for the insertion of a flat selector plate 73. As described above with reference to FIG. 1, the plate possesses recesses 74 along its bottom edge which cooperate with a number of individual switches 75 of a multiple-switching device permanently built into the machine. Inserted into the middle portion of the selector plate 73 is a transparent picture 76 upon which the type of laundry to be washed and the appertaining control program as well as the indicating scale are depicted. An image of this picture is thrown onto an opaque pane 80 by means of a projector lens system 77, a condensing lens 79 and a lamp 78. Located behind the pane 80 is a pointer 81 which is connected by suitable transmission means, indicated by a dot-and-dash line 82, with the program-control device. If desired, the pointer may also be located between the transparent picture 76 and the lens system 77.

Figures 11, 12:
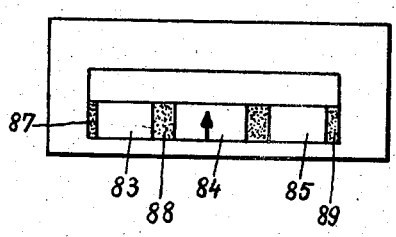
FIGS. 11 and 12 show two different indicating scales as they appear in a device according to FIG. 10 for respectively different washing programs.

FIGS. 11 and 12 show the images as they appear for two different washing programs respectively on the pane 80. The two images indicate the ranges 83, 84, 85, 86, corresponding to the main washing and rinsing operations, by a relatively bright illumination, whereas the ranges located before, intermediate and behind these active ranges appear in somewhat darker illumination as indicated at 87, 88 and 89. Consequently, when operating with such a projector-type device, the pointer, for example in the program according to FIG. 12, can be observed to advance in rapid steps in front of the range 87 in which the rinsing operation is not yet started. The image of the pointer then travels in correspondingly slow steps when passing through the scale range 86 correlated to the rinsing operation.

As described, the manually actuable member for selecting the washing program is completely removable from the washing machine in the embodiments so far described. However, a multiple-program selector may also be permanently built into the washing machine. This is the case with the embodiment illustrated in FIGS. 13, 14, 15 and 16.

Figure 13:
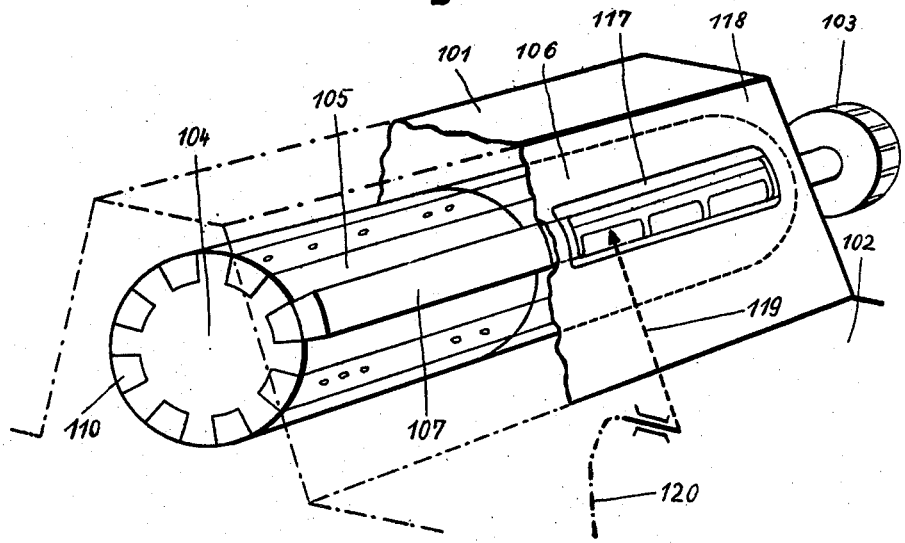
FIG. 13 shows in schematic perspective another control and indicating device according to the invention which comprises a multi-position selector member and is permanently built together with the washing machine proper.
Figure 14:
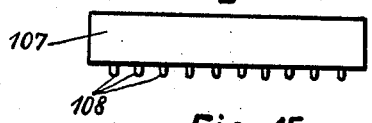
FIG. 14 is a lateral view of a multi-contact switch forming part of the apparatus according to FIG. 13.
Figure 15:
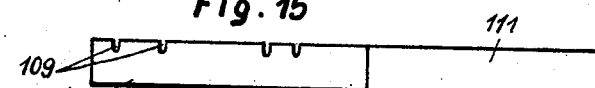
FIGS. 15 and 16 show separately two components of the selector switch according to FIG. 13.
Figure 16:
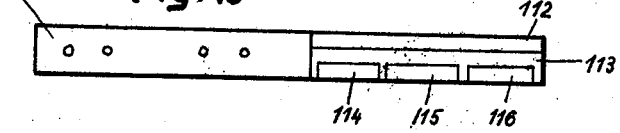

Denoted in FIG. 13 by 101 is a desk-shaped housing portion of the washing machine which upwardly protrudes from the table top 102 of the machine housing. Built into the desk structure is a program selector 104 which essentially consists of a rotary drum switch and can be turned between the available positions of rest by means of a knob 103. The left-hand portion 105 of the program selector constitutes the multiple-switch device. The right-hand portion 106 carries the indicating scales for the various programs. Denoted by 107 is a multiple switch which is permanently built into the washing machine for cooperation with the actuating means of the device 105. Shown in FIG. 14 is a lateral view of the multiple switch 107. Denoted by 108 are the actuating pins of the individual switches built into the unit 107. These actuating pins cooperate with recesses 109 in rod-shaped actuator pieces 110 of the switching device 105. FIGS. 15 and 16 separately illustrate these actuating pieces 110. Depending upon the selected setting of the selector switch 104, one or the other switching piece 110 enters into active engagement with the switching device 107. Consequently, different operative connections of the multiple switch 107 with the program-control device (not shown) are established in dependence upon the respectively different arrangement of recesses 109 on the respective switching pieces 110. The parts 111 which appertain to the indicating portion of the device are joined together with the respective switching pieces 110. On the outer side of the parts 111, corresponding to FIG. 14, there is provided a legend 112 for identifying the type of laundry to be washed, and an indicating scale 113 whose markings 114, 115, 116 correspond to the particular program such as pre-washing, clear-washing and rinsing. The scale 113 of the selected program is located behind a window 117 in the sloping front wall 118 of the desk structure so that the selected program is readily recognizable. The pointer 119 cooperating with the selected scale and driven by a connection 120 from the program-control device, further indicates the instantaneous stage of operation within the selected program.

The illustrated program selector affords setting the machine for eight different programs. Due to the fact that the switching pieces 110 form a single structural unit together with the appertaining indicating parts 111, any one of the eight switching and indicating structures 110, 111 can readily be removed by axial motion, if desired, and can be substituted by a different switching piece in order to afford setting the machine for still another program. The design can be such that the exchange can be effected by the user of the machine without the necessity of employing tools. For this purpose the desk-shaped portion of the housing may be provided, for example, with a removable cover on one side thereof, so that the exchange of the switching pieces can be performed after removing the cover. A selector switch which in itself comprises a multiplicity of different programs can also be designed, in departure from the embodiment shown in FIG. 11, so that the change in program is effected not by a rotational motion but by a linear displacement motion of the switching pieces relative to the stationary multiple-switching component. However, a combination of the rotary motion with an axial displacing motion may also be used for the purpose of program selection.

In the embodiment according to FIGS. 17 to 23, the manually adjustable selector portion is designed as a rectangular plate which has recesses, bosses or other means for actuating the multiple-switching assembly that passes along the selector plate and is mounted on a traveling slider.

As shown in FIGS. 17 and 18, the desk-shaped top portion 201 of the washing machine is provided with a rectangular opening 202 through which the indicating scale 203 and the identifying legend 204 of the selector plate 205 are visible. A pointer 206 cooperates with the scale 203 in order to indicate the instantaneous operating condition. The selector plate 205 is inserted into the housing portion 201 through a lateral slot 207. The opening 202 in housing portion 201 is covered by a pane 208 of transparent material so that splash-water cannot pass through the opening and reach the current-conducting parts of the apparatus. The rectangular selector plate 205 is provided with a number of bosses 209 arranged in four horizontal rows for cooperation with respective electric switches. The switch travel paths constituted by the horizontal rows of bosses 209 are located on the rear side of the plate 205 when the plate is properly inserted. The bosses 209 cooperate with a contact slider 210 which has a housing 211 of insulating material in which a multiplicity of individual electric switches 212 are mounted. The actuating pins 213 of these respective switches also consist of electrically good insulating material and protrude out of the insulating housing 211 for actuating the respective switches 212 by cooperating with the series of bosses 209.

The selector plate 205 is guided by U-shaped rails 214 and 215. The contact slider 210 is guided by rails 216 and 217. The guide rails 214 to 217 are joined together by holders 218, 219 so as to jointly form a single rigid subassembly built into the desk housing 201. A flexible cable 220 connects the individual switches 212 of the contact slider 210 with the program-control device 221 (FIG. 20) which is built into the machine.

According to FIG. 18, the indicating pointer 206 is rigidly connected with the slider 210 so as to participate in its travel. The pointer then runs in front of the program-indicating scale located on the front side 222 of the selector plate.

Figure 19:
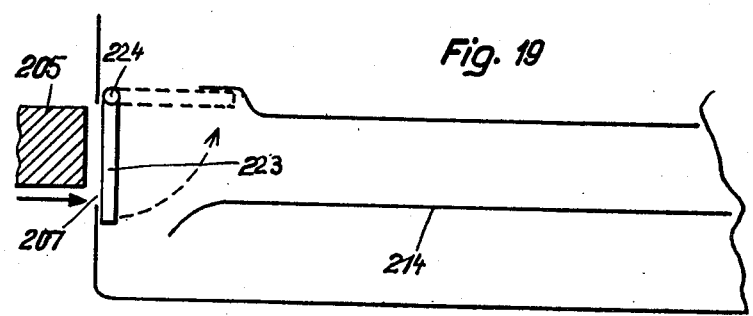

As is apparent from FIG. 19, the program plate 205 is inserted through the lateral slot 207 into the guide rail 214. The slot 217 is preferably closed by a lid 223 in order to obtain a good splash-water tight closure. The lid is hinged to the housing at 224 and is preferably kept in closed position by means of a spring (not shown).

Figure 20:
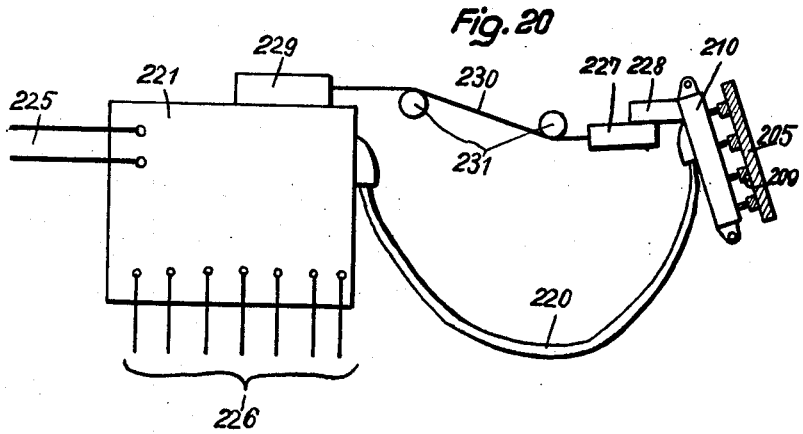

Shown at 225 in FIG. 20 are the current-supply leads which connect the washing machine with an outlet of the utility line. The leads 226 are connected with the individual component devices of the washing machine, namely the motor for driving the agitator or washing drum, the pump motor, the solenoids for controlling the water valves, and the electric heater if a heater is mounted in the machine. Such connection of the current supply with the individual load devices, however, is brought about by the programmer only when the programmer closes the individual circuits that are prepared by the switches of the program-selector device with the aid of the selector plate 205. A flexible cable 220 connects the programmer 221 with the above-described contact slider 210. Denoted by 227 and 228 is a schematically illustrated drive for returning the slider to the zero position after the control program is completed. The return may be effected by means of a spring as described above, or by any other suitable device similar to the drive and return mechanism of the carriage in a typewriter. The program-control device 221 actuates the advancing drive 229 for the contact slider 210 by means of a pull rope 230 trained over guide rollers 231.

Figures 21, 22:
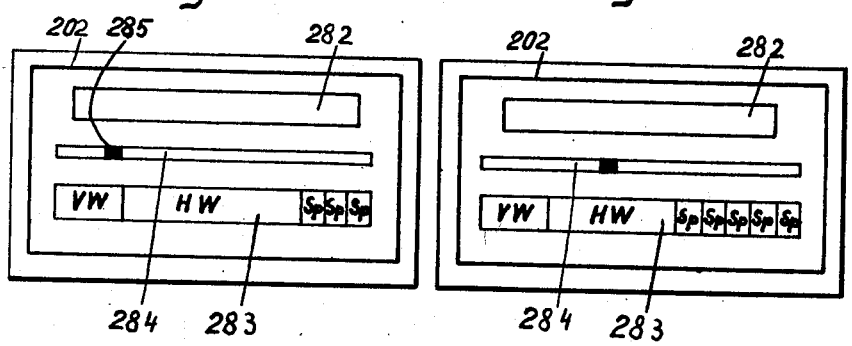

FIGS. 21 and 22 illustrate two different program-selector plates as they appear behind the window 202 (FIGS. 17, 18). FIG. 21 shows a plate for color laundry and FIG. 22 a plate for white laundry or other material to be washed at higher temperature. Denoted by 282 is the front area in which the designation of the control program is located. On the side facing the user of the washing machine, each program plate is provided with an indicating scale 283 subdivided into different program portions (pre-washing VW, main washing HW, rinsing Sp). The different scales 283 on the respective program cards all have the same length so that for each program the window portion of each scale is utilized over its entire length. The individual portions (VW, HW, Sp) of each scale have such a length in the traveling direction of the pointer, that a conclusion can be drawn with respect to the relative operating period required for each individual operation. Located above the scale in FIGS. 21 and 22 is a transparent slit 284 behind which a pointer mark 285 is displaceable. It is thus apparent, on the relatively large and clearly visible rectangular scale, what particular stage of operation takes place in the washing machine at any time.

The indicating scale used according to the invention need not necessarily represent an accurate elapse of time within each particular portion of the scale, but serves mainly for indicating the particular operating range within which the washing machine is working at the moment. The pointer may also be caused to temporarily stop within one of the scale portions, for example during the heating-up period until the desired water temperature is attained.

The indication of the operating condition with the aid of such exchangeable scales and an indicating pointer cooperating with the scale but irremovably connected with the mechanisms of the machine, is always in accordance with the actual stage of the program being performed, regardless whether at the particular moment the program-control device runs rapidly, is temporarily at rest, or runs at the normal speed.

While in the embodiments described above the indicating scales are located beneath the program-identifying designation or legend of the selector member, the apparatus can readily be modified by having the indicating scales located above or beside such program designation.

The invention is also applicable with automatic washing machines which, subsequent to washing and rinsing of the laundry, perform a partial drying operation by centrifuging the laundry within the same washing drum or water container. In such cases the selective program also includes an additional period of time and consequently a corresponding portion of the indicating scale, relating to the centrifuging operation of shorter or longer duration as may be desired.

When exchanging the program card or plate, the touching of electrically live parts must be prevented. For that reason, the sensing members proper, which cooperate with the bosses or other actuating means of the program member and thus translate the profile of these means into corresponding switching positions of the contact switches, are preferably made of a good electrically insulating material. It is further preferable to encapsule the electric contacts of the multiple switch by means of an insulating housing which is connected with the slider to travel together therewith. The flexible connecting cable between the contact slider and the stationary drive must also be given a good electrical insulation. Although sliding contacts similar to the trolley contacts of a gantry crane can be used, the contact rails and the trolley contacts in this case must be given particularly good attention with respect to proper insulation.

It is further advisable to provide for safety expedients in order to prevent a faulty insertion of the programming card or plate. The device therefore is preferably so dimensioned that a program can be started and peformed only when a program member is correctly inserted. This requirement can be satisfied, for example, by arranging the guiding means for the insertion of the program member and for the electric contacts in such a manner that a switch contact is closed only when the inserted selector member reaches the proper operating position, namely when the member is completely inserted, whereas the program performance is blocked as soon as the plate member is removed from this proper position. A particularly simple and reliable device for insertion or exchange of the selector members is obtained when providing the stationary portion of the device with guiding means that require the rectangular selector plates or cards to be pushed in from the side, the guiding means extending parallel to the actuating paths of the selector plates.

The apparatus is preferably designed so that a single selector member can be used for repeatedly performing one and the same program if desired. In this case, the programming device is to be automatically stopped upon completion of the individual program, and subsequent manual activity is to be necessary for re-starting the program. This can be done, for example, in the following manner. While the program is being performed, the contact slider is permitted to run to the limit position in which the automatic operation of the programmer switches itself off. Consequently, the contact slider and hence the indicating pointer remain stopped at the end of the indicating scale and at the end of the actuating path of the flat selector member. In order to repeat the program it is only necessary to pull the flat program member laterally somewhat out of its proper seat. This opens a limit contact and thereby electrically disconnects the automatic programmer. Simultaneously the contact slider is mechanically released from its transporting device and is moved back into the starting position by means of a spring. When the program member is now pushed back into its proper seat, the automatic programming performance is re-started. This device requires the slider to be provided with a return spring which becomes tensioned during progress of a program and is released at the end of the program so that the slider is constrainedly returned to its starting position.

Another possibility of repeating a given program is as follows. During the last step of the advancing program, the contact slider decouples itself automatically from its transporting device and is then returned to the starting position by a tensioned spring. For again starting a program a starter pushbutton is depressed. In this apparatus a mechanical stepping mechanism can be used for example, which is incrementally driven from the main magnet of the drive. In other respects, this apparatus can be designed similar to the carriage transport of a typewriter. The design is such that the sensing switches of the contact slider do not interfere with the return travel of the slider. Furthermore, during the return travel of the slider it is preferable to electrically disconnect the automatic circuits so that no undesired switching operations can take place.

It is of advantage to give the apparatus such a design that a program can be discontinued at any time during its progress. For example, when the program "hot washing of white laundry" is in progress and is to be switched during the heating-up period to the program for washing colored laundry at lower temperature, the final washing temperature may have to be changed from the originally desired value of 90° C. to 70° C. required for the new program. This change in ultimate temperature is effected by exchanging the selector member. However, in order to prevent loss of the warm water already heated to some extent, care must be taken that the automatic programmer is electrically disconnected when the selector plate member is pulled out. This can be done with the aid of the above-mentioned limit contact and by having the slider automatically turned to the starting position. Then, when the new program plate is inserted, the previously interrupted laundering operation can continue. Although the contact slider now is in its starting position, sufficient water is already filled into the washing machine and the pressure-sensing guard has already switched off, so that no additional water is supplied and the heating-up operation will continue but only until the water reaches the temperature of 70° C.

In order to simplify the control apparatus and to reliably secure the proper cooperation of program-selector plate and switch assembly, the guiding means for insertion of the selector member into the machine, and the guiding rails upon which the contact slider travels, are preferably designed as a single subassembly whose supporting parts are rigidly joined together.

The indicating scales of the respective program-selector plates have preferably the same length despite the differences in the respective programs. The individual ranges along the indicating scale are preferably given such a length that this length permits a conclusion as to the relative operating time required for the particular washing step represented by that range. However, the individual program ranges on the indicating scale may be given equal lengths, whereas the contact slider is operated at respectively different advancing speeds so that the ranges are traversed by the slider travel during respectively different periods of time. Wherever necessary, the contact slider may then be caused to perform idle steps at relatively great speeds.

The drive of the slider can be effected by a magnetic system, for example a relay device, or by a stepping motor, or by a synchronous motor connected with a stepping mechanism operating with a spring which is tensioned for displacing the slider.

The advancing motion of the contact slider is effected stepwise by means of pulses which can be taken either from the machine being controlled (for example after a preselected temperature is reached, after a predetermined water level is reached, or the like) or which pulses may be produced by a pulse generator. The pulse generator may consist for example of a synchronous motor which acts through a step-down transmission to control the contacts for controlling the speed of the washing-machine motor and which, by means of an additional contact also controls the centrifugating motor (directly or through a relay), so that the centrifugating operation immediately follows the washing motion of the agitator or drum and always takes place in the same sense of rotation. The same synchronous motor may also serve to continually open and close respectively different contacts which secure different pulse sequences. By employing such different pulse sequences, for example one pulse per one second, thirty seconds, three minutes, ten minutes or similar intervals, it is possible to select a faster or slower advancing travel of the contact slider. This requires that respective connecting leads extend from all pulse-transmitter contacts of the pulse transmitter to a corresponding number of switches on the contact slider. This makes it possible that during the course of an entire program, the programmer is controlled to operate at different advancing speeds under control by the program-selector card or plate itself.

The above-mentioned control pulses may also be provided by means of a mechanical device which is coupled with the washing drum or agitator drive of the machine.

In apparatus according to the invention, the individual switching units of the multiple-switching device controlled by the program-selector card or plate can be so dimensioned that they are directly connected electrically in the main operating circuits of the washing machine. For example, these individual units of the multiple switch may directly switch the electromagnets of the valve controls, the washing machine motor and other machine components. Only those electric devices which require a particularly high power supply, for example the electric heating device with which the machine is preferably equipped, will have to be controlled indirectly by having the programming device actuate a relay in whose energizing circuit a switching unit of the multiple-switching device is connected.

It will be obvious to those skilled in the art, upon studying this disclosure, that my invention can be given a great variety of modifications and hence can be embodied in apparatus other than particularly illustrated and described herein, without departing from the features of my invention and within the scope of the claims annexed hereto.

I claim:

1. Control and indicating apparatus for automatic washing machines of selectively programmed operation, comprising a washing-machine structure, a program-control device mounted on said structure, program-selector means operatively connected to said device and having manually movable means for selection of different washing programs, an indicating device having a portion normally non-detachable from said machine structure and comprising an indicator member connected to said control device and movable in accordance with the course of the selected washing program, said indicating device having a number of different scales of indicia fixedly connected with said manual means and correlated to said different programs respectively, whereby selective actuation of said manual means places one of said respective scales into coactive relation to said indicator means in accordance with the selected washing program, said manually movable selector means comprising a selector member insertable into and removable from said portion of said indicating device, said portion having electric switch means electrically connected to said program-control device and selectively actuable by said selector member when the latter is inserted into said portion of said indicating device.

2. Control and indicating apparatus for automatic washing machines of selectively programmed operation, comprising a washing-machine structure, a program-control device mounted on said structure, program-selector means operatively connected to said device and having manually movable means for selection of different washing programs, an indicating device having a portion normally non-detachable from said machine structure and comprising an indicator member connected to said control device and movable in accordance with the course of the selected washing program, said indicating device having a number of different scales of indicia fixedly connected with said manual means and correlated to said different programs respectively, whereby selective actuation of said manual means places one of said respective scales into coactive relation to said indicator means in accordance with the selected washing program, said manually movable selector means comprising a selector member insertable into and removable from said portion of said indicating device, said portion having a window and said selector member having an area visible through said window when said selector member is inserted into said portion, one of said respective scales of indicia being located on said visible area.

3. Control and indicating apparatus for automatic washing machines of selectively programmed operation, comprising a washing-machine structure, a program-control device mounted on said structure, program-selector means operatively connected to said device and having manually movable means for selection of different washing programs, an indicating device having a portion normally non-detachable from said machine structure and comprising an indicator member connected to said control device and movable in accordance with the course of the selected washing program, said indicating device having a number of different scales of indicia fixedly connected with said manual means and correlated to said different programs respectively, whereby selective actuation of said manual means places one of said respective scales into coactive relation to said indicator means in accordance with the selected washing program, said manually movable selector means comprising a selector member insertable into and removable from said portion of said indicating device, said portion having a window and said selector member having an area visible through said window when said selector member is inserted into said portion, one of said respective scales of indicia being located on said visible area, said portion having electric switch means electrically connected to said program-control device and selectively actuable by said selector member when the latter is inserted into said portion of said indicating device.

4. Control and indicating apparatus for automatic washing machines of selectively programmed operation, comprising a washing-machine structure, a program-control device mounted on said structure, program-selector means operatively connected to said device and having manually movable means for selection of different washing programs, an indicating device having a portion normally non-detachable from said machine structure and comprising an indicator member connected to said control device and movable in accordance with the course of the selected washing program, said indicating device having a number of different scales of indicia fixedly connected with said manual means and correlated to said different programs respectively, whereby selective actuation of said manual means places one of said respective scales into coactive relation to said indicator means in accordance with the selected washing program, said manually movable selector means comprising a selector member insertable into and removable from said portion of said indicating device, said selector member having a flat and rectangular shape and being stationary when inserted, one of said scales of indicia being located on one side of said rectangular selector member and being visible from the outside of said indicating device when said selector member is inserted, said selector member having switch actuating means on its other side, said indicating device having a slider displaceable relative to the inserted selector member in accordance with the operation of said program-control device, and electric switch means mechanically connected and displaceable together with said slider to be acted upon by said switch actuating means when said slider travels relative to said selector member, said switches being electrically connected with said program-control device for operation of the latter in accordance with the washing program selected by the inserted selector member.

5. In a control and indicating device according to claim 4, said indicator member comprising a pointer connected with said slider to travel together therewith, said pointer being located in front of said scale of indicia when said selector member is inserted.

6. In a control and indicating device according to claim 4, said indicator member comprising a lamp fastened to said slider to travel together therewith, said selector member having a slot along said scale of indicia, and said lamp being located behind said slot to effect indication on said scale.

7. A control and indicating apparatus according to claim 4 comprising a plurality of said flat and rectangular selector members for respectively different washing programs, said plurality of selector members having respectively different scales of indicia, said different scales having the same active length, said portion of said indicating device having a window through which any of said scales is visible over said length, and said indicator member being displaceable along said length for each selected control program.

References Cited in the file of this patent

UNITED STATES PATENTS

| | | |
|---|---|---|
| 1,801,129 | Warren | Apr. 14, 1931 |
| 2,391,718 | Lindemann | Dec. 25, 1945 |
| 2,501,274 | Hamilton | Mar. 21, 1950 |
| 2,502,823 | Clark | Apr. 4, 1950 |
| 2,599,234 | Clark | June 3, 1952 |
| 2,767,332 | Willard | Oct. 16, 1956 |
| 3,008,059 | Gorsuch | Nov. 7, 1961 |